United States Patent [19]
Lee

[11] Patent Number: 6,012,974
[45] Date of Patent: Jan. 11, 2000

[54] METHOD FOR GENERATING A ROUGH SURFACE ON A POLYMER OR A POLYAMIDE MEMBRANE FOR THE TOP LAYER OF A FLEXIBLE RULE

[76] Inventor: Shih Tung Lee, 4F., No. 653, Ming Shui Rd., Taipei, Taiwan

[21] Appl. No.: 09/052,938

[22] Filed: Apr. 1, 1998

[51] Int. Cl.[7] .................................................. B24B 19/22
[52] U.S. Cl. ............................................................... 451/57
[58] Field of Search ..................... 451/28, 57, 66, 451/107, 183, 176, 456, 49

[56] References Cited

U.S. PATENT DOCUMENTS

| | | | |
|---|---|---|---|
| 492,099 | 2/1893 | Nelson | 451/66 |
| 550,806 | 12/1895 | Thomas | 451/66 |
| 2,671,990 | 3/1954 | Reed | 451/183 |
| 3,067,551 | 12/1962 | Maginnis | 451/49 |
| 3,780,626 | 12/1973 | Hollier, Jr. | 451/183 X |
| 4,778,634 | 10/1988 | Douglas | 451/49 X |
| 5,175,900 | 1/1993 | Hadgis | 451/66 X |
| 5,540,616 | 7/1996 | Thayer | 451/456 X |

*Primary Examiner*—Robert A. Rose
*Assistant Examiner*—Anthony Ojini
*Attorney, Agent, or Firm*—Birch, Stewart, Kolasch & Birch, LLP

[57] ABSTRACT

A method for generating a rough surface on a polymer or a polyamide membrane for the top layer of a flexible rule comprises pulling a polymer or a polyamide membrane with both surface being smooth from an unfinished roll. A grinding process for grinding one side of the membrane to a rough surface with low reflection rate is carried out by a series of coarse, median, and fine grain-size sand wheels. A cleaning process then wipes off dust and particles generated at the preceding grinding process by a series of brushing components and vacuuming components. The collection of the finished membrane with a rough surface results in a finished roll. By adhering the finished membrane to the reading surface of a flexible rule, the readings and the scale of the rule surface will be fully protected and easily distinguished.

10 Claims, 2 Drawing Sheets ized 6,012,974

METHOD FOR GENERATING A ROUGH SURFACE ON A POLYMER OR A POLYAMIDE MEMBRANE FOR THE TOP LAYER OF A FLEXIBLE RULE

BACKGROUND OF THE INVENTION (1) Field of the Invention

The invention relates to a method for generating a rough surface on a polymer or a polyamide membrane for the top layer of a flexible rule, which the polymer or the polyamide membrane is utilized as the top layer covering the flexible rule to help achieve clear reading and minimizing the notorious reflection effect.

(2) Description of the Prior Art

Generally, a flexible rule is essential an extended-length strip made of slim and flexible metal sheet, where measuring readings are printed on single or double surfaces of the extended-length metal strip. In a well-finished flexible rule, surface treatment on both side of the flexible rule is necessary for protecting the readings or color on the rule surface from scratches during repeatedly rolling or bending operation of the flexible rule. Conventionally, the surface treatment for the rule surface is to apply a layer of lacquer or the like by spraying over the reading surface of the flexible rule. By providing the smooth shining layer of lacquer or the like, the reading surface then can be protected and show a lovely appearance. However, though the traditional surface treatment can provide protection on the reading surface of the rule, yet the spraying layer is sometimes too thin to provide sufficient protection for the readings from being rapidly scratched off.

To overcome the aforesaid disadvantage of conventional surface treatment, the up-to-date method is to apply a transparent layer of polymer or polyamide membrane on top of the reading surface of the flexible rule. The polymer or polyamide membrane has appreciable strength against scratch and sufficient adhesion, and so can provide better protection than the lacquer layer does.

The major purpose of applying a lacquer layer, a polymer or a polyamide membrane on the reading surface of the flexible rule is to protect the paint and the printed readings from scratch off. Nevertheless, in practice, the aforesaid layer sometimes causes vision problems in reading. It is well known that the application field of the flexible rule could be anywhere indoors or outdoors and each place might have different light intensity. In case that a shining source exists in the application field, the smooth reading surface of the flexible rule will reflect the intake light into user's eyes, and make the reading hard to tell. The reason for such a vision problem of the flexible rule under a shining circumstance is the smoothness of the lacquer layer, or the polymer or polyamide membrane on the reading surface. Under a shining source, the smooth protect layer on top will reflect most of the intake light intensity, and the reflected light will then impede the clear reading of the correct scale on the reading surface of the flexible rule.

Therefore, an invention devoting to resolving aforesaid disadvantages of the top layer on the reading surface of a flexible rule is necessary, definitely.

SUMMARY OF THE INVENTION

Accordingly, it is a primary object of the present invention to provide a method for generating a rough surface on a polymer or a polyamide membrane for the top layer of a flexible rule, which the top layer on the reading surface of the flexible rule will be rough and have low reflection rate to help a correct scale reading.

The method for generating a rough surface on a polymer or a polyamide membrane for the top layer of a flexible rule in accordance with the present invention utilizes a polymer or a polyamide layer with a low reflection rate surface as the top surface of the flexible rule to prevent from the vision obstacle of reflection in telling the reading on the reading surface of the flexible rule. By utilizing several sets of sand wheels with various grain sizes to provide continuous grinding on one side of the polymer or the polyamide membrane, the surface of the polymer or polyamide membrane will be converted to a rough surface with low reflection rate, from a smooth surface before grinding. The rough surface could be a foggy surface, a fine scratch surface, or any the like. Applying the membrane with a rough surface on top of the reading surface of the flexible rule, by adhering the surface other than the rough surface of the membrane to the reading surface, can provide a protection layer of the flexible rule with low reflection rate. Nevertheless, due to the transparency of the polymer or polyamide membrane, the reading of the reading surface of the flexible rule can be correctly told with any vision problem.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a method for generating a rough surface on a polymer or a polyamide membrane for the top layer of a flexible rule. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
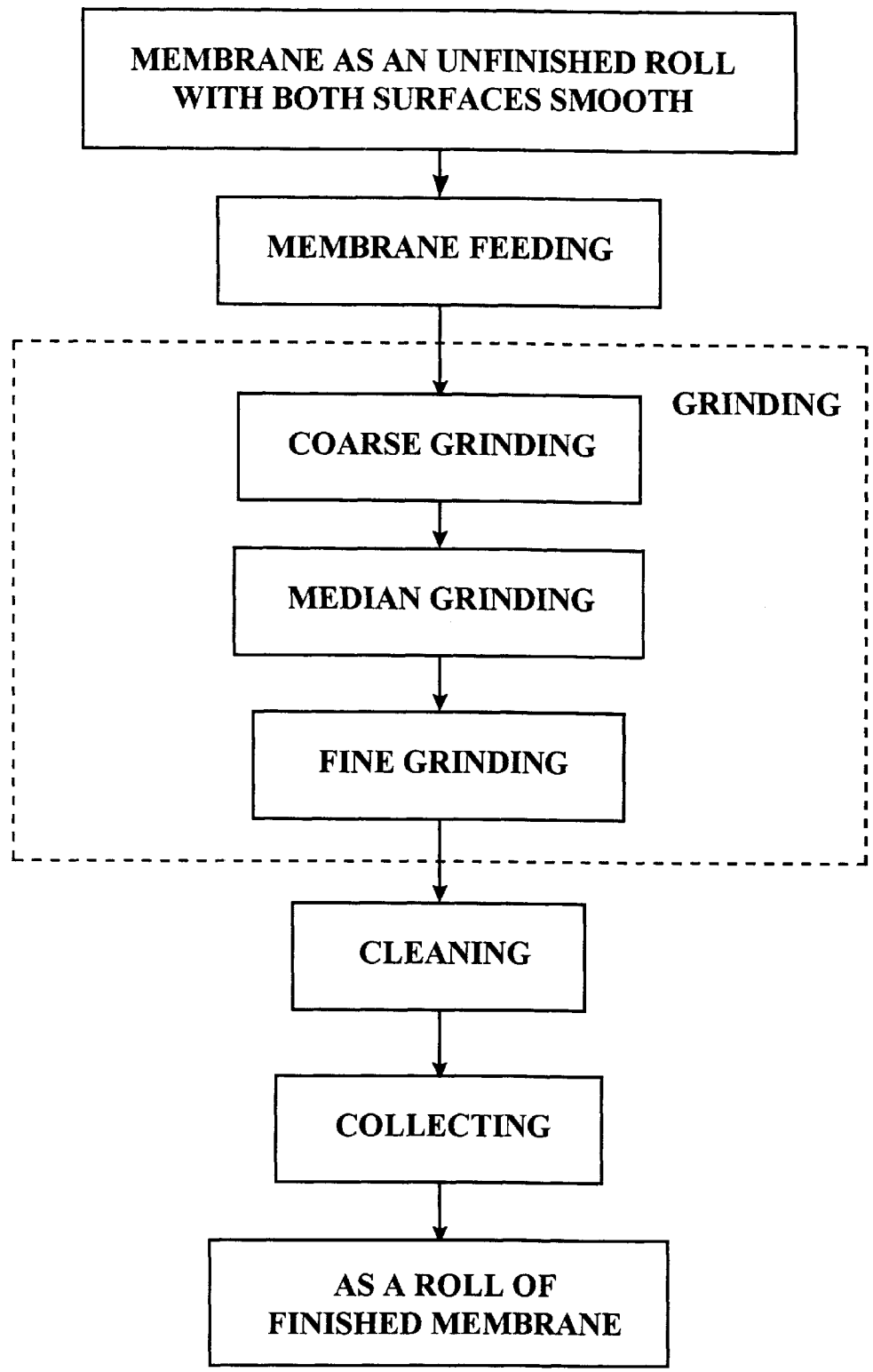
FIG. 1 is a flow chart of the preferred embodiment of the method for generating a rough surface on a polymer or a polyamide membrane for the top layer of a flexible rule in accordance with the present invention.

Referring now to FIG. 1, a flow chart of the preferred embodiment of the method for generating a rough surface on a polymer or a polyamide membrane for the top layer of a flexible rule in accordance with the present invention is present. The polymer or polyamide membrane used in the present invention is provided as a source roll 1 of polymer or polyamide membrane, which the membrane thickness ranges from 0.024 mm to 0.036 mm and with both membrane being smooth and reflective. The source roll 1 is preferably installed onto a wheel set so that the membrane of the source roll 1 can be pulled out and fed into a grinding device by rotating the wheel set. The grinding device for performing one side grinding of the membrane further comprises a coarse grinding unit, a median grinding unit, and a fine grinding unit. The coarse grinding unit quickly removes the smoothness at one side of the membrane by a plurality of sand wheels with larger grain sizes. The median grinding unit is utilized to make the rough surface of the membrane generated by the coarse grinding unit less rough by a plurality of sand wheels with median grain sizes. By providing the fine grinding unit with a plurality of sand wheels with smaller grain sizes after the median grinding unit, the roughness at the side of the membrane can then be ground to a minimum scale with a low reflection rate. After the grinding device, the membrane is further fed into a cleaning unit for wiping off the dust and particles generated at the preceding grinding process. The cleaning unit can utilize a plurality of brushing and vacuum components to clean thoroughly the ground surface of the membrane. At the final stage, the membrane with a rough surface can be stored as a finished roll 2 ready for topping the reading surface of a flexible rule.

Figure 2:
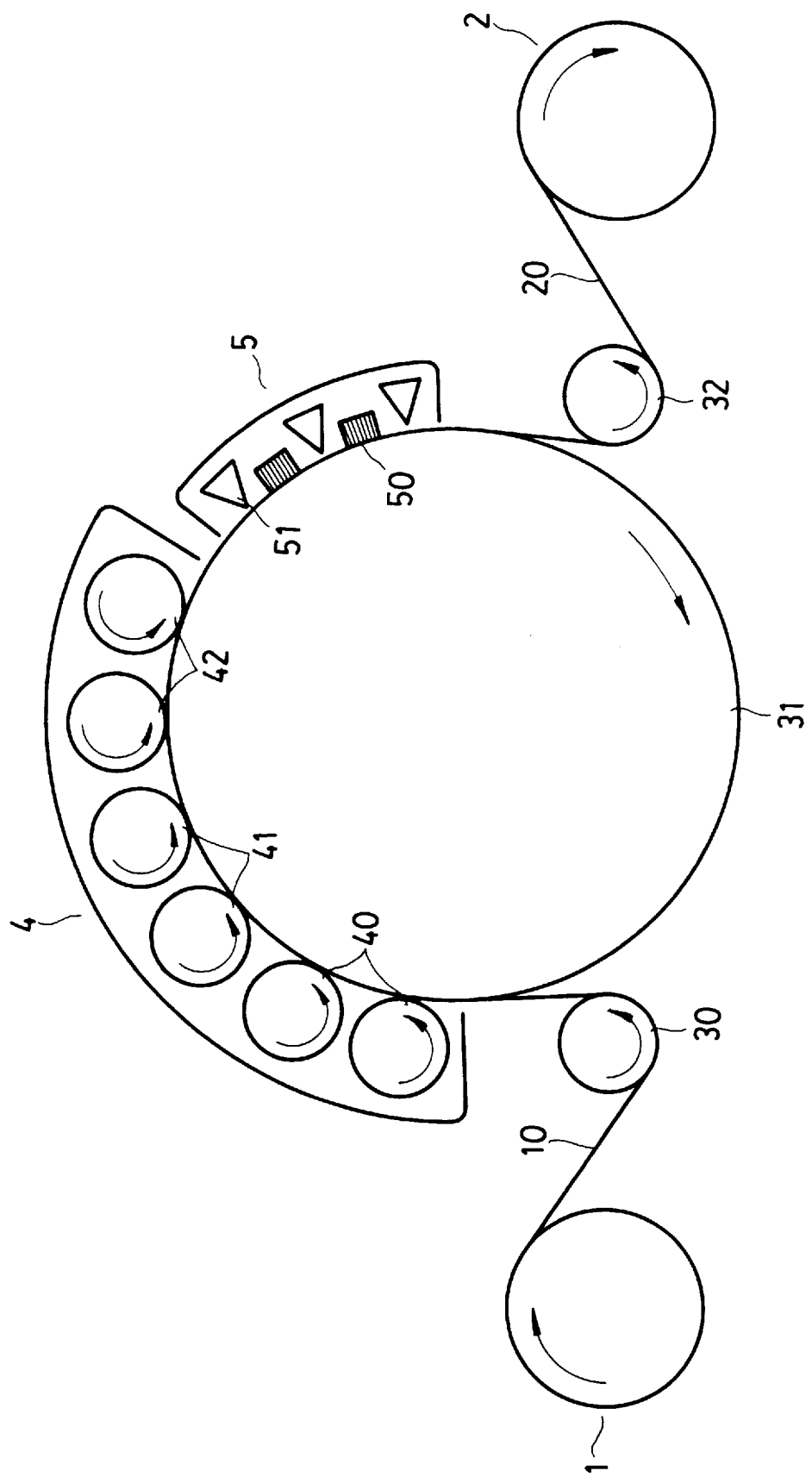
FIG. 2 is a schematic view of the preferred setup for performing the method for generating a rough surface on a polymer or a polyamide membrane for the top layer of a flexible rule in accordance with the present invention.

Referring now to FIG. 2, a schematic view of the preferred setup for performing the method for generating a rough surface on a polymer or a polyamide membrane for the top layer of a flexible rule in accordance with the present invention is illustrated. In FIG. 2, the relationship among the polymer or polyamide membrane and the components for performing the method in accordance is further elucidated. The unfinished membrane 10 with both surfaces smooth and reflective is provided as a source roll 1. While in processing, the unfinished membrane 10 is pulled out of the source roll 1 at one end, and is converted to a finished membrane 20 with one rough surface stored as a finished roll 2 after passing a first guiding wheel 30, a second guiding wheel 31, and a third guiding wheel 32. The second guiding wheel 31, which is located between the first guiding wheel 30 and the third guiding wheel 32, has the largest diameter among three guiding wheels 30, 31, and 32; so that much time is needed for the unfinished membrane 10 pass the second guiding wheel 31. While in the stage during the unfinished membrane 10 passing the second guiding wheel 31, all roughness treatment and cleaning of the polymer or polyamide membrane will be completed. While conveyed at the second guiding wheel 31, the unfinished polymer or polyamide membrane will undergo continuous coarse, median, and fine surface grinding processes before the cleaning process. The grinding process is performed by a series of sand wheels with various grain sizes as the grinding unit 4. As the preferred setup shown in FIG. 2, the grinding unit 4 arranged along the upper circumference of the second guiding wheel 31 further comprise a pair of coarse grain-size sand wheels 40 close to the first guiding wheel 30 for coarse grinding, a pair of median grain-size sand wheels 41 for median grinding, and a pair of fine grain-size sand wheels 42 close to the third guiding wheel 32 for final grinding. Preferably, all sand wheels of the grinding unit 4 are installed in the same frame, and the frame is capable of applying the same normal force for all sand wheels to press the unfinished membrane 10 onto the circumference of the second guiding wheel 31 and for all sand wheels to operate synchronically. Preferably, the normal force is ranged between 0.8 and 1.2 kg/cm$^2$. Moreover, sand wheels in the grinding unit 4 have the same rotation speed corresponding to the second guiding wheel 31. While the second guiding wheel 31 rotating at 60 RPM, the rotation speed for sand wheels is preferable between 80 and 90 RPM. Under such a rotation speed combination, the inventive method can generate a polymer or polyamide membrane with a surface transparent but low reflection rate.

As shown in FIG. 2, the membrane 10 passing through the grinding unit 4 will immediately enter a cleaning unit 5 for surface cleaning process. The cleaning unit 5 further comprises a plurality of brushing components 50 and vacuum components 51 arranged in a series along the circumference of the second guiding wheel 31. Preferably in the cleaning unit 5, the brushing component 50 and the vacuum component 51 can be arrange alternatively to achieve maximum cleaning effect. After the cleaning unit 5, the finished polymer or polyamide membrane 20 will then go through the third guiding wheel 32 and be collected as the finished roll 2. The finished polymer or polyamide membrane 20 in the finished roll 2 is now with a surface rough and less-reflective.

In a typical manufacturing process of a flexible rule, aforesaid finished polymer or polyamide membrane 20 can be topped to the reading surface or both surfaces of the flexible rule by regular adhesion operation. The flexible rule product applying the finished polymer or polyamide membrane membrane in accordance with the present invention will have an easy-reading surface as well as a protected surface. Compared with the conventional flexible rule, vision interference from the reflection over the reading surface of the flexible rule applying the present invention is no more remarkable.

According to the present invention, the arrangement of the sand wheels in the grinding unit 4 is not necessary to be pairs of coarse grain-size sand wheels 40, median grain-size sand wheels 41, and fine grain-size sand wheels 42. Alternatively, the grinding unit 4 can also be consisted of series sand wheels with grain sizes varying from coarse to fine along the direction in which the membrane is conveyed. Moreover, the arrangement and quantity of the brushing components 50 and the vacuuming components 51 in the cleaning unit 5 can also be flexibly adjusted to meet any application situation.

While the present invention has been particularly shown and described with reference to a preferred embodiment, it will be understood by those skilled in the art that various changes in form and detail may be without departing from the spirit and scope of the present invention.

I claim:

1. A method for generating a rough surface on a membrane for a top layer of a flexible rule, the membrane being one of a polymer and a polyamide, the method comprising the steps of:

removing the membrane from an unfinished roll, both surfaces of the membrane being smooth;

grinding one side of the membrane to a rough surface with a low reflection rate, a series of sand wheels being simultaneously used during the step of grinding the one side;

cleaning at least one of dust and particles from the membrane during a cleaning process; and collecting the membrane with a rough surface as a finished roll.

2. The method for generating a rough surface of a flexible rule according to claim 1, wherein the step of grinding further comprises the step of simultaneously using a series of coarse, median and fine grain-size sand wheels on the membrane.

3. The method for generating a rough surface of a flexible rule according to claim 2, wherein the step of simultaneously using a series of coarse, median and fine grain-size sand wheels includes the step of using at least two coarse grain-size sand wheels, using at least two median grain-size sand wheels and using at least two fine grain-size sand wheels.

4. The method for generating a rough surface of a flexible rule according to claim 2, wherein the series of sand wheels apply a normal force to the membrane which normal force ranges from 0.8 to 1.2 kg/cm$^2$.

5. The method for generating a rough surface of a flexible rule according to claim 1, wherein the step of cleaning includes the step of wiping away the at least one of dust and particles which are generated by the step of grinding.

6. The method for generating a rough surface of a flexible rule according to claim 1, wherein the step of cleaning includes the step of using a plurality of brushing components and vacuuming components.

7. The method for generating a rough surface of a flexible rule according to claim 6, wherein the step of using a plurality of brushing and vacuuming components includes alternating the brushing and vacuuming components.

8. The method for generating a rough surface of a flexible rule according to claim 1, wherein the step of grinding includes the step of rotating the membrane on a guiding wheel, the guiding wheel such that the membrane follows a curved path and wherein the series of sand wheels surround a periphery of the guiding wheel.

9. The method for generating a rough surface of a flexible rule according to claim 8, wherein the guiding wheel and the series of sand wheels are each rotatable about a rotation axis and the rotation axes being generally parallel.

10. The method for generating a rough surface of a flexible rule according to claim 8, wherein the step of cleaning occurs while the membrane is on the surface of the guiding wheel.

* * * * *